I. S & H. R. Russell.
Mower.
N° 67914.  Patented Aug. 20, 1867
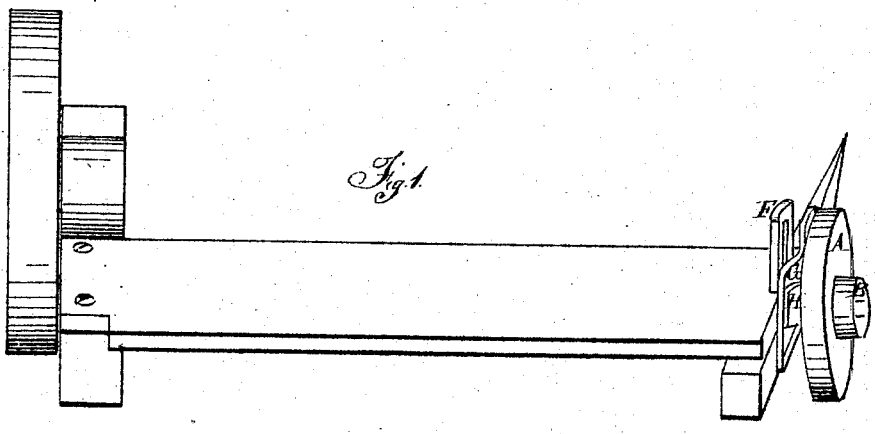
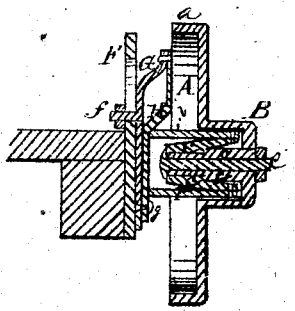
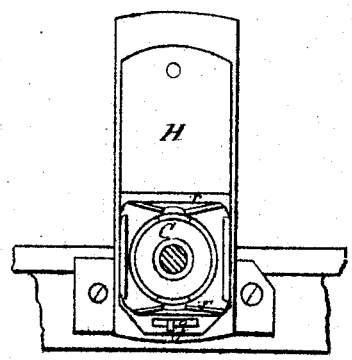
Witnesses
Geo. A. Morrison
Geo. W. Rothwell
Inventors
I. S and H. R. Russell
Per O. Hughs, Supt.

United States Patent Office.

ISAAC S. RUSSELL AND HENRY R. RUSSELL, OF NEW MARKET, MARYLAND.

Letters Patent No. 67,914, dated August 20, 1867.

IMPROVEMENT IN HARVESTERS.

The Schedule referred to in these Letters Patent and making part of the same.

TO ALL WHOM IT MAY CONCERN:

Be it known that we, ISAAC S. RUSSELL and HENRY R. RUSSELL, of New Market, in the county of Frederick, and State of Marland, have invented a new and improved Harvester-Wheel; and we do hereby declare the following to be a full and exact description of the same, reference being had to the accompanying drawings, which are made part of this specification, and in which—

Figure 1 is a view in perspective of our invention.

Figure 2 is a central vertical section through wheel A.

Figure 3 is a side view of our invention, the wheel A being removed in order to show more plainly the construction and operation of the vibrating support B.

In turning a harvester in the field it is well known that the machine turns upon the larger wheel, that wheel remaining stationary, or at most describing a small circle, while the smaller wheel describes a large circle around the spot on which the larger wheel rests. In doing this the same difficulty is experienced that is experienced by railroad cars in turning short curves. The outer wheel is forced around in a line not coincident with the direction of its face, but at an angle with it, thereby wasting a great amount of power and wearing out the wheel very rapidly. To obviate this difficulty in harvesters we have constructed our improved wheel, which will in turning any curve always change the direction of its own axle so as to move in a line coincident with the direction of the plane of the wheel.

To effect this we construct a wheel, A, with a very wide flange, $a$, and a stout, deep hub, $b$, the outer extremity of the hub firmly fixed to an introverted shaft, $c$, upon which the wheel moves, the shaft $c$ or axle by being thus attached to the hub having the same motion as the wheel. This shaft is supported by and has its bearings in an elongated hollow socket, C, which, held in position by two pins, $p\ p$, moves upon them as on a pivot, having a horizontal motion backward and forward with the machine like a hinge. When the socket C moves thus on its pivot $p\ p$, of course the wheel A, the axle of which bears in the socket C, partakes of the movement and changes its direction. Now, to the side of the harvester we attach a strong, fixed support, F, and to this, by means of the screw and nut $f$ at the upper end, and a bolt at the lower end, we fasten a strong fixed brace, G, the upper extremity of which is bent outward and then bent upward parallel to the upright support F. Through the very extremity of this brace G passes a pin which serves as a pivot, upon which hinges a vibrating support, H, of the form shown in fig. 2, a slot and pin, shown at $g$, confining the swinging of the support H within the proper limits. The support H has two projections, I I, in the outer extremity of which the pins $p\ p$ are fixed, upon which the socket C pivots. Thus constructed the vibrating support H swings backwards and forwards the length of the slot $g$, as shown in fig. 3. The wheel A, supported entirely by the vibrating support H, partakes of this motion. The wheel A also moves, as before described, backward and forward by means of its socket C on the pivots $p\ p$. Two little ears, $e\ e$, projecting outward from the side of the support H, slightly beyond the inner end of the socket C, keep the motion of the socket C within the proper limits, and prevent the wheel A from changing its direction too much.

Now, suppose a harvester constructed with the wheel or supports thus described, and as shown in fig. 1, to be standing in the field, and you desire to turn it; it is evident that unless you would face your wheel round, as we have described the wheel of the railroad car being forced round, you must contrive the wheel so that the side of its periphery, which, as it moves is ahead, will constantly turn inward toward the machine. This our improved wheel always does, whether the harvester be turned toward the right or the left. If a machine such as is shown in fig. 1 be turned to the right, first the vibrating support H is thrown forward, thus changing the direction of the wheel to a certain degree, as desired. The force applied to move the machine round then acting on the socket C at the pivot $p\ p$, causes the inner extremity of the socket C to be thrown forward and outward, and the outer extremity backward and inward, thus bringing the wheel which bears on the socket round in the same direction. The two motions, that of the vibrating support H and that of the socket C, thus combine with each other in increasing the change in the direction of the wheel A. The motion of the vibrating support H, which takes place before the other motion begins, also by partially changing the direction of the socket C facilitates the further change in the direction of the socket, which is to be produced by the movement of the wheel A backward or forward, as the case may be.

Having thus described our invention, what we claim as new, and desire to secure by Letters Patent, is—

1. The vibrating support H, substantially as and for the purpose described.

2. The wheel A, having its axle (operating) in the pivoted socket C, substantially as and for the purpose described.

ISAAC S. RUSSELL,
HENRY R. RUSSELL.

Witnesses as to ISAAC S. RUSSELL's signature:
 WILLIAM W. OGBORN,
 JOHN T. LOWE.

Witnesses as to HENRY R. RUSSELL's signature:
 J. A. REINHART,
 E. F. JACKSON.